US009348945B2

(12) United States Patent
Kim et al.

(10) Patent No.: US 9,348,945 B2
(45) Date of Patent: May 24, 2016

(54) MODIFYING SEARCH RESULTS BASED ON DISMISSAL ACTION ASSOCIATED WITH ONE OR MORE OF THE SEARCH RESULTS

(71) Applicant: Google Inc., Mountain View, CA (US)

(72) Inventors: Hyunchan Kim, Guri (KR); Soo Kim, Seoul (KR); Jegeon Jung, Seoul (KR)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 14/013,729

(22) Filed: Aug. 29, 2013

(65) Prior Publication Data
US 2015/0066973 A1 Mar. 5, 2015

(51) Int. Cl.
G06F 17/30 (2006.01)

(52) U.S. Cl.
CPC .... *G06F 17/30979* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| 5,960,422 | A | 9/1999 | Prasad | |
|---|---|---|---|---|
| 8,051,076 | B1 | 11/2011 | Garg et al. | |
| 2004/0254932 | A1 | 12/2004 | Gupta et al. | |
| 2007/0260597 | A1* | 11/2007 | Cramer | G06F 17/30867 |
| 2008/0071544 | A1* | 3/2008 | Beaufays | G06F 17/30867 704/270.1 |
| 2008/0140657 | A1 | 6/2008 | Azvine et al. | |
| 2009/0216749 | A1 | 8/2009 | Hardt | |
| 2009/0282021 | A1* | 11/2009 | Bennett | G06F 17/30648 |
| 2009/0325546 | A1* | 12/2009 | Reddy | H04B 1/3833 455/414.1 |
| 2010/0082610 | A1* | 4/2010 | Anick | G06F 17/2235 707/723 |
| 2010/0105370 | A1* | 4/2010 | Kruzeniski | G06F 3/0482 455/414.3 |
| 2011/0208712 | A1 | 8/2011 | Jones et al. | |
| 2012/0174011 | A1* | 7/2012 | Cabrera-Cordon | G06F 3/0488 715/769 |
| 2012/0331420 | A1 | 12/2012 | Meyer et al. | |
| 2013/0124555 | A1* | 5/2013 | Duquene | G06F 17/30873 707/769 |
| 2013/0325481 | A1* | 12/2013 | van Os | G10L 21/00 704/275 |

FOREIGN PATENT DOCUMENTS

WO    WO2004031991    4/2004

OTHER PUBLICATIONS

International Search Report and Written Opinion of PCT Serial No. PCT/US14/053175 Dec. 4, 2014.

* cited by examiner

*Primary Examiner* — Bai D. Vu
(74) *Attorney, Agent, or Firm* — Middleton Reutlinger

(57) ABSTRACT

Methods and apparatus for modifying search results based a dismissal action associated with one or more of the search results by a user to whom the search results are presented. Initially provided search results may include at least a first set of search results that are associated with a first entity and a second set of search results that are associated with a second entity. In response to a dismissal action associated with one or more of the search results of the first set, the initial search results may be modified to demote and/or omit one or more search results of the first set. The user may be provided with the modified search results.

20 Claims, 10 Drawing Sheets

| Search Result | Entity | Set |
|---|---|---|
| S1 | A | 1 |
| S2 | A | 1 |
| S3 | B | 2 |
| S4 | B | 2 |
| S5 | C | 3 |
| S6 | D | 4 |
| S7 | C | 3 |
| S8 | ? | 5 |
| S9 | A | 1 |
| S10 | B | 2 |

FIG. 4A

| Search Result | Entity | Set |
|---|---|---|
| S11 | A | 1 |
| S12 | A, B | 1, 2 |
| S13 | B | 2 |
| S14 | B | 2 |
| S15 | A | 1 |
| S16 | C | 3 |
| S17 | D | 4 |
| S18 | A, B | 1, 2 |
| S19 | C | 3 |
| S20 | D | 4 |

FIG. 4B

MODIFYING SEARCH RESULTS BASED ON DISMISSAL ACTION ASSOCIATED WITH ONE OR MORE OF THE SEARCH RESULTS

BACKGROUND

Internet search engines provide information about Internet accessible documents such as web pages, images, text documents, and/or multimedia content. A search engine may identify the documents in response to a user's search query that includes one or more search terms. The search engine ranks the documents based on the relevance of the documents to the query and the importance of the documents and provides search results that include aspects of and/or links to the identified documents.

SUMMARY

This specification is directed generally to modifying search results, and, more particularly, to modifying search results based on a dismissal action associated with one or more of the search results. Initially provided search results may include at least a first set of search results that are associated with a first entity and a second set of search results that are associated with a second entity. In response to a user dismissal action associated with one or more of the search results of the first set, the search results may be modified to demote and/or omit one or more of the search results of the first set. For example, an initial display of search results for a search query of "penguins" may include a first set of search results that are associated with the bird penguin, a second set of search results that are associated with the ice hockey team the Pittsburgh Penguins, and a third set of search results that are associated with the publishing group Penguin Group. In response to a dismissal action associated with a search result associated with the bird penguin, the initial display of search results may be modified to create a modified display of search results that demote or omit those search results that are associated with the bird penguin, but maintain those search results associated with the ice hockey team the Pittsburgh Penguins and those search results that are associated with the publishing group Penguin Group. For example, the user may scroll past a search result associated with the bird penguin on a search results webpage providing initial search results and the user may be provided with the modified display of search results when the user scrolls past the search result associated with the bird penguin. Also, for example, the user may swipe away a search result associated with the bird penguin on a search results webpage providing initial search results and the user may be provided with the modified display of search results when the user swipes away the search result associated with the bird penguin.

In some implementations a computer implemented method may be provided that includes the steps of: providing initial search results that are responsive to a search query, the initial search results including a first set of search results that are each associated with a first entity and a second set of search results that are each associated with a second entity, wherein the first entity is distinct from the second entity, and wherein the first set of search results include one or more search results that are distinct from one or more of the search results of the second set of search results; determining a dismissal action associated with a first search result of the first set of search results, the dismissal action indicative of lack of user interest in the first search result; and modifying, based on the dismissal action, the initial search results to create modified search results, wherein modifying the initial search results includes omitting or demoting one or more search results of the first set of search results.

This method and other implementations of technology disclosed herein may each optionally include one or more of the following features.

The method may further include providing the modified search results in response to the dismissal action associated with the first search result.

Demoting the search results of the first set of search results may include altering, in the modified search results, at least one display parameter of the search results of the first set of search results. Altering the display parameter may include increasing an amount of dimming. The method may further include: determining a second dismissal action associated with a second search result of the first set of search results, the dismissal action indicative of lack of user interest in the second search result; and further increasing, based on the dismissal action, the amount of dimming of the search results of the first set of search results.

The method may further include: determining a dismissal value of the first set of search results, the dismissal value indicative of a number of dismissed search results of the first set of search results, including the dismissal of the first search result by the dismissal action; determining if the dismissal value satisfies a dismissal threshold; and modifying the initial search results based on the dismissal action to create modified search results when the dismissal value satisfies the dismissal threshold.

Omitting or demoting the search results of the first set of search results may include omitting, in the modified search results, the search results of the first set of search results.

The initial search results may be provided as a search results webpage and the dismissal action of the first search result may include scrolling past the first search result such that at least a portion of the first search result is no longer provided on a display of the search results webpage.

The initial search results may be provided as a search results webpage and the dismissal action of the first search result may include swiping away of the first search result.

The initial search results may be provided as audible search results and the dismissal action of the first search result may include a verbal user input dismissing the first search result.

The initial search results may be provided as a search results webpage and modifying the initial search results may include generating a modified search results webpage to supplant the search results webpage.

The initial search results may be provided as a search results webpage and modifying the initial search results may include modifying one or more presentation parameters of the search results webpage to provide the modified search results.

Omitting or demoting the search results of the first set of search results may include omitting or demoting, in the modified search results, the search results of the first set of search results, including any that are also of the second set of search results.

Omitting or demoting the search results of the first set of search results may include: demoting, to a first degree, in the modified search results, the search results of the first set of search results that are not of the second set of search results; and demoting, to a second degree, any of the search results of the first set of search results that are also members of the second set of search results, wherein the first degree is greater than the second degree.

The method may further include: receiving the search query; identifying the initial search results that are responsive to the search query; identifying, for each search result of the initial search results, one or more entities associated with the search result; determining one or more of the initial search results to include in the first set of search results based on association with the first entity of the entities; and determining one or more of the initial search results to include in the second set of search results based on association with the second entity of the entities, wherein providing the initial search results includes providing the initial search results to a client device.

The search results of the first set of search results may all be distinct from the search results of the second set of search results.

Providing the initial search results that are responsive to the query may include providing the initial search results to a client device to present the initial search results to a user.

Providing the initial search results that are responsive to the query may include presenting the initial search results to a user.

In some implementations a computer implemented method may be provided that includes the steps of: receiving a search query submitted by a client device; identifying a plurality of search results that are responsive to the search query; identifying, for each search result of the search results, one or more representative entities associated with the search result; determining a first set of search results of one or more of the search results that are each associated with a first entity set of one or more of the representative entities; determining a second set of search results of one or more of the documents that are each associated with a second entity set of one or more of the representative entities, wherein the second entity set is distinct from the first entity set, and wherein one or more of the search results of the first set of search results are distinct from one or more of the search results of the second set of search results; providing initial search results to the client device that are responsive to the search query, the initial search results including the first set of search results and including the second set of search results; providing modification instructions to modify the initial search results based on user dismissal of one or more of the initial search results, the modification instructions including instructions to: determine a dismissal action associated with a first search result of the first set of search results, the dismissal action indicative of lack of user interest in the first search result, and determine, based on the dismissal action, modified search results that omit or demote one or more search results of the first set of search results.

The method may further include providing the modified search results in response to the dismissal action associated with the first search result.

The search results may be provided to the computing device as a search results webpage and providing the modification instructions may include providing the modification instructions to the client device for execution at least in part by the client device. Providing the modification instructions to the client device for execution at least in part by the client device may include embedding a link to the modification instructions in the search results webpage.

Providing the modification instructions may include providing the modification instructions to the client device for execution at least in part by the computing device.

The method may further include: receiving selection input indicative of the selection; executing the modification instructions to determine the modified search results; and providing the modified search results to the client device.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein modify search results that are responsive to a search query. The search results are modified based on one or more dismissal actions by a user that are associated with one or more of the search results. Such modification of the search results represents a new aspect of the search results that may be based on the one or more user dismissal actions. The modified search results may be utilized by one or more applications, such as a browser and/or a search system, to provide refined search results to a user of the application in response to the one or more dismissal actions. The refined search results may better represent the user's informational desires in issuing the search query.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A is an example table utilized in describing an example method of determining sets of search results based on entities associated with the search results.

FIG. 4B is an example table utilized in describing an additional example method of determining sets of search results based on entities associated with the search results.

DETAILED DESCRIPTION

Figure 1:
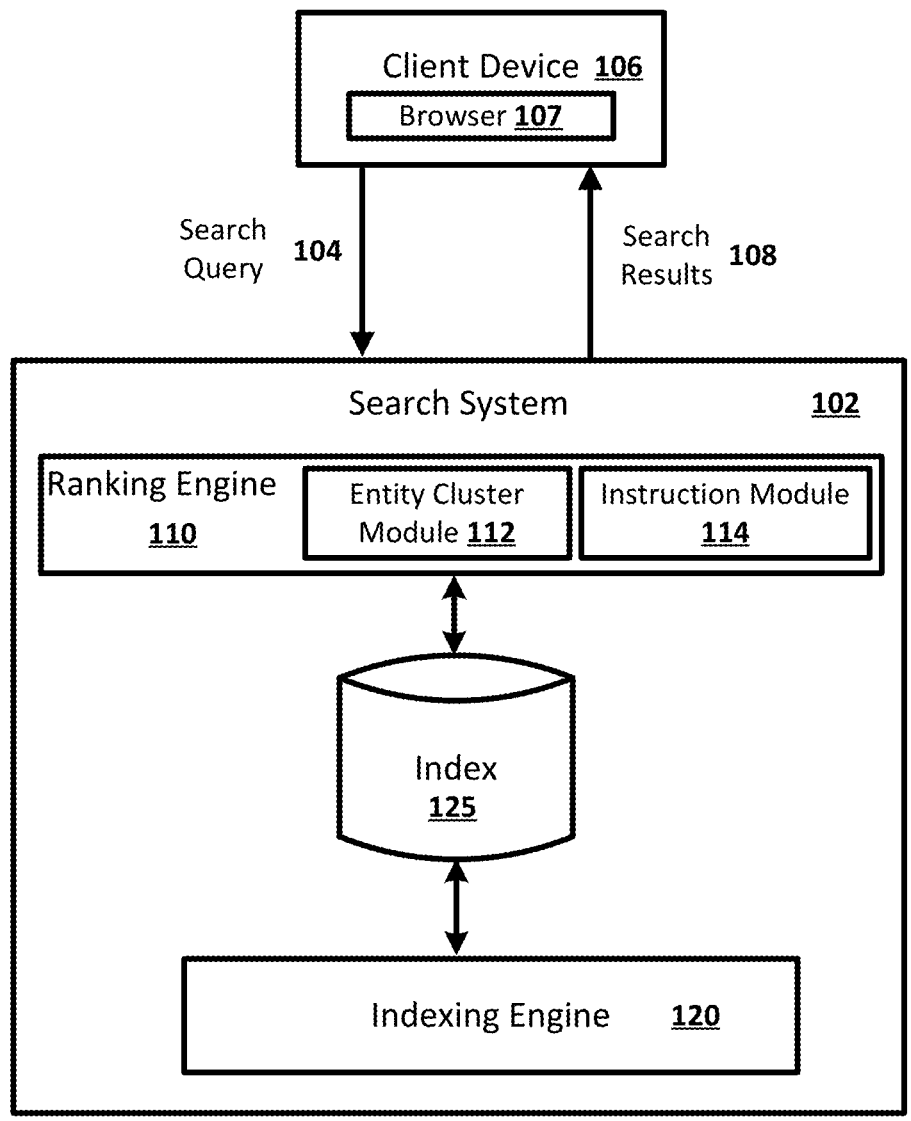
FIG. 1 illustrates an example environment in which search results may be modified based on a dismissal action associated with one or more of the search results.

FIG. 1 illustrates an example environment in which search results may be modified based on a dismissal action associated with one or more of the search results. As referred to herein, a "dismissal action" associated with a search result may include, for example, a scrolling dismissal action, a swiping away dismissal action, and/or other dismissal action by a user that is indicative of a lack of interest by the user in the search result. A scrolling dismissal action may include, for example, scrolling at least partially past a search result in a user interface utilizing: a mouse-scroll, a scrolling gesture via a user's finger on a presence-sensitive input mechanism (e.g., a touch-screen device), a voice-based scroll (e.g., spoken input to effectuate scrolling in an interface), an eye-movement based scroll (e.g., based on monitoring a user's eyes via a camera or other device), and/or other appropriate scrolling mechanism. A swiping away dismissal action may include, for example, a mouse-click on a search result followed by dragging away of the search result, a swiping away gesture by a user's finger on a presence-sensitive input mechanism, an eye-movement based swiping away, and/or any other appropriate swiping away mechanism.

The example environment includes a client device 106 and a search system 102. The search system 102 can be implemented in one or more computers that communicate, for example, through a network. The search system 102 is an example of an information retrieval system in which the systems, components, and techniques described herein may be implemented and/or with which systems, components, and techniques described herein may interface.

A user may interact with the search system 102 via the client device 106. The search system 102 receives search queries 104 from the client device 106 and returns search results 108 in response to the search queries 104. Each search query 104 is a request for information. The search query 104 can be, for example, in a text form and/or in other forms such as, for example, audio form and/or image form. Other computer devices may submit search queries to the search system 102 such as additional client devices and/or one or more servers implementing a service for a website that has partnered with the provider of the search system 102. For brevity, however, the examples are described in the context of the client device 106.

The client device 106 may be a computer coupled to the search system 102 through a network such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of search queries and the sending and receiving of data over a network. For example, the client device 106 may execute one or more applications, such as a browser 107, that allow users to formulate queries and submit the queries to the search system 102.

As discussed herein, in some implementations the client device 106 may execute one or more applications, such as the browser 107, that execute instructions provided by the search system 102 to modify search results based on a dismissal action associated with one or more of the search results. The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102 may be implemented as, for example, computer programs running on one or more computers in one or more locations that are coupled to each other through a network.

The search system 102 includes an indexing engine 120 and a ranking engine 110. The indexing engine 120 maintains an index 125 for use by the search system 102. The indexing engine 120 processes documents and updates index entries in the index 125, for example, using conventional and/or other indexing techniques. For example, the indexing engine 120 may crawl one or more resources such as the World Wide Web and index documents accessed via such crawling. Also, for example, the indexing engine 120 may receive information related to one or documents from one or more resources such as web masters controlling such documents and index the documents based on such information. A document is any data that is associated with a document address. Documents include web pages, word processing documents, portable document format (PDF) documents, images, videos, and feed sources, to name just a few. Each document may include content such as, for example: text, images, videos, sounds, embedded information (e.g., meta information and/or hyperlinks); and/or embedded instructions (e.g., ECMAScript implementations such as JavaScript).

In some implementations, the index 125 may include index entries that associate each of one or more documents with a respective one or more entities associated with the document. For example, for each of a plurality of documents, a mapping (e.g., data defining an association) between the document and one or more entities associated with the document may be identified in the index 125. In some implementations an index of documents and associated entities may be provided in an index or other database that is separate from the index 125. In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. In some implementations an entity may be referenced by a unique entity identifier that may be used to identify the entity. In some examples in this specification, an entity may be referenced with respect to a unique entity identifier. In some other examples, the entity may be referenced with respect to one or more alias and/or other property of the entity.

In some implementations a document may only be mapped to a single entity. For example, the document may only focus on the single entity and/or the single entity may be determined to be more important to the document than one or more other entities. In some implementations a document may be mapped to multiple entities. In some of those implementations scores may be associated with the multiple entities and the scores may indicate the strength of the association of the entity to the document. For example, scores from 0 to 1 may be associated with each of the entities, with 1 being most indicative of association of the entity to the document. For example, a webpage for the ice hockey team the Pittsburgh Penguins may be associated with multiple entities such as the entity associated with the ice hockey team the Pittsburgh Penguins and the entity associated with the sport of ice hockey. A score may be associated with each of the two entities based on, for example, a determined strength of association of each of the entities to the document.

In some implementations, the association between the documents and entities may be accessible to an entity cluster module 112 in determining one or more sets of search results for a query and/or by the instruction module 114 in determining instructions to modify search results based on a dismissal action associated with one of the search results. In some implementations, an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc.

In some implementations an association between a document and an entity may be based on presence in the document of one or more other entities related the entity. For example, links between entities may be identified from a database such as an entity properties database. For example, the entity properties database may include spouse information for an entity and an association between a document and a person may be based on occurrence of a spouse of the person in the document. For example, if a person's alias is ambiguous, presence of an alias of the person's spouse in a document along with the person's alias may be more indicative of the person being associated with the document than if the person's alias appeared in the document without the alias of the person's spouse. Also, for example, an association between a document and an entity may be based on presence of additional and/or alternative entities associated with a given entity, such as co-workers, co-stars, similar types of businesses, etc. Additional and/or alternative factors may be utilized in associating a document with one or more entities.

In this specification, the term "database" and "index" will be used broadly to refer to any collection of data. The data of the database and/or the index does not need to be structured in any particular way and it can be stored on storage devices in one or more geographic locations. Thus, for example, the index 125 may include multiple collections of data, each of which may be organized and accessed differently. For example, a first collection of index entries may be utilized to identify documents responsive to the search query 104 and a second collection of index entries may be utilized to identify additional information related to responsive documents such as, for example, one or more entities associated with a responsive document.

The ranking engine 110 uses the index 125 to identify documents responsive to the search query 104, for example, using conventional and/or other information retrieval techniques. The ranking engine 110 calculates scores for the documents identified as responsive to the search query 104, for example, using one or more ranking signals. Each ranking signal provides information about the document itself and/or the relationship between the document and the search query 104.

In some implementations, ranking signals may include information about the search query 104 itself such as, for example, the terms of the query, an identifier of the user who submitted the query, and/or a categorization of the user who submitted the query (e.g., the geographic location from where the query was submitted, the language of the user who submitted the query, interests of the user who submitted the query, and/or a type of the client device 106 used to submit the query (e.g., mobile device, laptop, desktop)). The identification of the user can be, for example, a user name or the IP address of the client device 106. The geographic location from where the search query 104 was submitted can be, for example, a continent, a country, a state, a city, or geographic coordinates, such as latitude and longitude.

Also, for example, ranking signals may additionally and/or alternatively include information about the terms of the search query 104 such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Also, for example, ranking signals may additionally and/or alternatively include information about the document such as, for example, a measure of the quality of the document, a measure of the popularity of the document, the URL of the document, the geographic location where the document is hosted, when the search system 102 first added the document to the index 125, the language of the document, the length of the title of the document, and/or the length of the text of source anchors for links pointing to the document.

The ranking engine 110 then ranks the responsive documents using the scores. For example, the responsive documents are ranked based on the scores. The search system 102 uses the responsive documents ranked by the ranking engine 110 to generate search results 108. The search results 108 include search results corresponding to the documents responsive to the search query 104. For example, each of one or more search results 108 can include a title of a respective of the documents, a link to a respective of the documents, and/or a summary of content from a respective of the documents that is responsive to the search query 104. For example, the summary of content may include a particular "snippet" or section of the document that is responsive to the search query 104. Also, for example, for a search result associated with an image document, the search result may include a reduced size display of the image document, a title associated with the image document, and/or a link to the image document. Also, for example, for a search results associated with a video document, the search result may include an image from the video, a segment of the video, a title of the video, and/or a link to the video. Other examples of search results 108 include a summary of information responsive to the search query 104 and/or an answer responsive to the search query 104. The summary can be generated from documents responsive to the search query 104 and/or from other sources.

The search results 108 are transmitted to the client device 106 in a form that may be presented to the user. For example, the search results 108 may be transmitted as a search results web page to be displayed via the browser 107 executing on the client device 106 and/or as one or more search results conveyed to a user via audio. FIGS. 5A-6D present examples of search results webpages and are described in additional detail herein. The search results 108 may be presented to the user based on the ranking of the corresponding search result documents. For example, when the search results 108 are presented as a search results webpage, the search results 108 may be displayed based on the ranking of the corresponding search result documents. For example, the most prominently displayed search result may be the highest ranked search result, the next most prominently displayed search result may be the second highest ranked search result, and so forth. In some implementations a presentation of search results 108 may include a subset of all of the search results for a search query. For example, an initial search results webpage may include the top X ranked search results 108 and may include a link to view additional search results webpages that each includes additional search results ranked lower than the top X ranked search results. Thus, in some implementations search results 108 that are transmitted to client device 106 and modified in response to a dismissal action associated with one or more of the search results 108 may only be a subset of all search results responsive to the search query 104.

As described herein, in some implementations the search results 108 may be provided to the client device 106 in combination with search result set information identifying one or more sets of search results to which the search results 108 belong and/or with instructions to modify the display of the search results based on a dismissal action associated with one or more of the search results 108. For example, the search results 108 may be provided as a webpage that includes HTML code and content mapped in the HTML code. The HTML code itself and/or the content mapped in the HTML code may include search result information identifying, for each search result, to which of one or more sets of search results the search result belongs. The content mapped in the HTML code may additionally and/or alternatively include instructions, such as instructions in a client-side script implementation such as an ECMAScript, that may be accessed by the client device 106 and executed, in whole or in part, by the client device 106 to modify the search results 108. For example, the instructions may be provided as JavaScript instructions that are mapped in a search results webpage and the browser 107 may execute the JavaScript instructions to modify the display of the search results 108 based on a dismissal action associated with one or more of the search results 108. For example, the instructions may include instructions to determine a dismissal action associated with a search result, identify the one or more sets of search results associated with the dismissed search result, and modify the display of search results to demote any search results that are associated with the one or more sets of search results associated with the dismissed search result. For example, the display of search results may be modified by changing the presentation parameters, via manipulation of the search results webpage in the browser 107, of any search results that are associated with the one or more sets of search results associated with the dismissed search result. For example, the degree of dimming of any such search results may be increased via manipulation of the search results webpage in the browser 107.

In some implementations the instructions to modify the search results 108 based on a dismissal action associated with one or more of the search results 108 may be executed, in whole or in part, by the search system 102. For example, an indication of a user dismissal action via the client device 106 may be provided to the search system 102, and the search system 102 may execute the instructions to modify the search results and provide the modified search results to the client device 106. For example, the modified search results may be provided as a new search results webpage to the client device 106 and/or may be communicated to the client device 106 via a script executing on the client device 106 to enable the client device 106 to update the search results webpage to include the modified search results.

The ranking engine 110 includes an entity cluster module 112 and an instruction module 114. In some implementations the entity cluster module 112 and/or the instruction module 114 may be combined and/or provided as modules separate from the ranking engine 110. In some implementations the entity cluster module 112 may perform aspects of one or more of the steps of FIG. 2 such as steps 210 and/or 215. In some implementations the instruction module 114 may perform aspects of one or more of the steps of FIG. 2 such as step 230.

The entity cluster module 112 determines sets of search results based on entities associated with the search results 108 that are responsive to the search query 104. The sets of search results are determined so that each set includes one or more search results that are each associated with at least one shared entity. For example, the entity cluster module 112 may determine a first set of search results that are all associated with a shared entity A and a second set of search results that are all associated with a shared entity B. The search results 108 responsive to a search query 104 for which sets of search results are determined may be all search results responsive to the query or may be a subset of search results. For example, in implementations in which an initial search results webpage is initially provided that includes a subset of the search results, the search results responsive to a query for which sets of search results are initially determined may be those search results that will be included on the initial search results webpage.

In some implementations, the entity cluster module 112 may determine an entity that is associated with a search result by referencing index 125 and/or other database that contains information related to one or more entities associated with a search result and/or a document associated with a search result. For example, as described herein, index 125 may contain, for each of a plurality of documents, a mapping between the document and one or more entities related with the document. Thus, in some implementations the index 125 may be referenced to identify one or more entities associated with the search result document that is associated with a search result.

In some implementations, the entity cluster module 112 determines a single entity for each search result. For example, in some implementations the index 125 and/or other database may only identify, for each document, the single entity most strongly associated with that document. Also, for example, in some implementations the index 125 and/or other database may identify, for each document, one or more entities related to that document and the entity cluster module 112 may select a single entity from the one or more entities. For example, each entity for a document may be associated with an entity score that indicates the strength of the association of the entity to the document and one of the entities may be selected based on the entity score. For example, scores from 0 to 1 may be associated with each of the entities, with 1 being most indicative of relation of the entity to the document, and the entity associated with the highest entity score may be selected.

With reference to FIG. 4A, an example method of determining sets of search results based on a single entity for each of the search results is described. FIG. 4A illustrates a table listing search results S1-S10 in the first column and entities associated with each of the search results S1-S10 in the second column. For example, search result S1 has an associated entity A, search result S2 has an associated entity A, search result S3 has an associated entity B, and so forth. In some implementations the entities of the second column represent the entity that is most strongly associated with the search result document. In some of those implementations the entity cluster module 112 may determine the entities of the second column by identifying a search result document associated with the search result and identifying an entity associated with the search result document. A numerical identifier of each of the sets of search results associated with each of the search results S1-S10 is illustrated in the third column. Other identifiers may be utilized such as non-numerical identifiers. The entity cluster module 112 determines the sets of search results based on the entity of the second column. Those search results associated with entity A have been determined to be in set 1, those search results associated with entity B have been determined to be in set 2, those search results associated with entity C have been determined to be in set 3, the search result associated with entity D has been determined to be in set 4, and the search result that is non-associated with an entity (as indicated by "?") has been determined to be in set 5. A search result may be non-associated with an entity based on insufficient data related to the search result document associated with the search result and/or based on no entity being associated strongly enough with the search result document. For example, in some implementations entity scores may be associated with each entity associated with a document and a search result may be non-associated with an entity if no entity score satisfies a threshold entity score indicative of at least a threshold strength of association with the document.

In some implementations, the entity cluster module 112 determines multiple entities for one or more search results. For example, in some implementations the index 125 and/or other database may identify, for each document, all entities associated with that document. Also, for example, in some implementations the index 125 and/or other database may identify, for each document, one or more entities related to that document and the entity cluster module 112 may select a subset of one or more of the entities. For example, each entity for a document may be associated with an entity score that indicates the strength of the association of the entity with the document and multiple entities may be selected based on the entity score. For example, scores from 0 to 1 may be associated with each of the entities, with 1 being most indicative of association of the entity to the document, and any entities satisfying a threshold entity score indicative of at least a threshold strength of association to the document may be selected.

With reference to FIG. 4B, an example method of determining sets of search results based on one or more entities for each of the search results is described. FIG. 4B illustrates a table listing search results S11-S20 in the first column and entities associated with each of the search results S11-S20 in the second column. For example, search result S11 has an associated entity A, search result S12 has associated entities A and B, search result S13 has an associated entity B, and so forth. In some implementations the entities of the second column represent entities that satisfy at least a threshold strength of association to the search result document. In some of those implementations the entity cluster module 112 may determine the entities of the second column by identifying a search result document associated with the search result and identifying one or more entities associated with the search result document. A numerical indication of each of the sets of search results associated with each of the search results S11-S20 is illustrated in the third column. The entity cluster module 112 determines the sets of search results based on the entity of the second column. Those search results associated with entity A have been determined to be in set 1, those search results associated with entity B have been determined to be in set 2, those search results associated with entity C have been determined to be in set 3, and those search results associated with entity D have been determined to be in set 4. It is noted that search results S12 and S18 are each associated with both set 1 and set 2 as they are each associated with both entity A and entity B.

In some implementations, the entity cluster module 112 may provide the search results 108 to the client device 106 with search result set information that provides an indication of which of the search results belong to each of the sets of search results. For example, each of the search results 108 may be associated with embedded information that associates the search result with one or more of the sets of search results. Also, for example, the search results 108 may be provided as a search results webpage and the search results webpage may include embedded tags that identify, for each of the sets of search results, which of the search results belong to the set of search results. As described herein, any provided search result set information may be utilized by the client device 106 to determine modified search results. Also, as described herein, in some implementations the sets of search results determined by the entity cluster module 112 may be utilized by the search system 102 to determine modified search results. In some of those implementations the search result set information may not be provided to the client device 106.

The instruction module 114 determines and/or provides instructions to modify the search results 108 based on a dismissal action associated with one or more of the search results 108. Generally, the instructions include instructions to: determine a dismissal action associated with one or more of the search results 108 belonging to one or more sets of the search results, wherein the dismissal action is indicative of lack of user interest in the one or more search results as indicated via one or more inputs to the computing device 106; and/or determine, based on the dismissal action associated with the one or more search results, modified search results that omit or demote search results that are associated with the same one or more sets of search results as the dismissed search results.

The modified search results may be provided in place of the search results 108. For example, with reference to FIG. 4A, a user dismissal action associated with a search result S1 from a search results webpage listing search results S1-S10 may be determined; modified search results may be determined that demote or omit search results S1, S2, and S9 that are associated with the same set of search results as search result S1 (set 1) and that maintain search results S3-S8 and S10 that are associated with other search result sets (e.g., sets 2-5); and the modified search results may be provided to the user in place of the search results 108. For example, the modified search results may be displayed to the user in response to the dismissal action associated with search result S1. Also, for example, with reference to FIG. 4B, a user dismissal action associated with a search result S12 from a search results webpage listing search results S11-S20 may be determined; modified search results may be determined that demote or omit search results S11-S15, and S18 that are associated with one or more of the same sets of search results as search result S12 (sets 1 and 2) and that maintain search results S16, S17, S19, and S20 that are associated with other search result sets (e.g., sets 3 and 4); and the modified search results may be provided to the user in place of the search results 108.

In some implementations the instructions to modify the search results 108 may be provided to the client device 106 for execution on the client device 106. For example, the instructions may be included with and/or mapped in a provided search results webpage as a client-side script and the client device 106 may access the script and execute the instructions to modify the display of search results. For example, the search results 108 may be provided as search results webpage that includes search result set information that associates each search result with one or more of the sets of search results and that includes the instructions to modify the search results 108. The browser 107 may provide an initial display of the search results 108 that includes search results from all of the sets of search results. The browser 107 may execute the instructions to: determine a dismissal action associated with one or more of the search results 108 belonging to one or more sets of the search results, wherein the dismissal action is indicative of lack of user interest in the one or more search results as indicated via one or more inputs to the computing device 106; and/or determine, based on the dismissal action associated with the one or more search results, modified search results that omit or demote search results that are associated with the same one or more sets of search results as the dismissed search results; and provide the modified search results in place of the search results 108. For example, the modified search results may be provided in place of the search results 108 by the client device 106 by hiding search results that are members of the same one or more sets of search results as the dismissed search results, changing display characteristics of search results that are members of the same one or more sets of search results as the dismissed search results, etc.

In some other implementations the instructions to modify the search results based on a dismissal action associated with one or more of the search results may be provided for use by the search system 102. For example, the instructions may be executed, in whole or in part, by the search system 102. For example, an indication of a user dismissal action associated with one or more search results may be received via input from the client device 106, and the ranking engine 110 may execute the instructions to modify the display of the search results and provide the modified search results to the client device 106. For example, the modified search results may be provided as a new search results webpage to be loaded on the client device 106 and/or may be communicated to the client device 106 via a script executing on the client device 106 to enable the client device 106 to update a search results webpage. For example, the modified search results may be provided by the search system 102 by communicating, to client device 106, one or more changes to be made to an initial display of search results such as dimming of certain of the search results, hiding of certain of the search results, etc.

In some implementations the instructions to modify the search results may be fixed instructions and may be executed with reference to search result set information of search results to enable appropriate modification of search results. In some implementations the search result set information may be utilized in determining instructions to modify search results based on a dismissal action associated with one or more of the search results. For example, the instructions may be determined particularly for the search results and incorporate and/or embed the search result set information.

With reference to FIGS. 5A-5D, example graphical user interfaces are illustrated and utilized in describing example methods of modifying an initial display of search results based on a dismissal action associated with one of the search results. The example graphical user interfaces of FIGS. 5A-5D may be displayed to a user via one or more applications executing on client device 106 such as browser 107.

Figure 5A:
FIG. 5A is an example graphical user interface illustrating an example of an initial display of search results for a search query.

FIG. 5A is an example graphical user interface illustrating an example of an initial display of search results for a search query. In FIG. 5A the search query "washington" 504A is submitted to a search system 102, via the graphical user interface, and a set of search results that are responsive to the search query 504A are generated by the search system 102 and provided for presentation in the user interface. The search results in FIG. 5A include search results 1A-D that are based on search result documents responsive to the query. The search results 1A-D may be ranked according to one or more signals as described herein such as document based signals and/or query based signals.

The search results 1A and 1B may both be members of a first set of search results as they are both most strongly associated with a shared entity associated with the state of Washington. The search result 1C may be a member of a second set of search results as it is most strongly associated with an entity associated with the University of Washington. The search result 1D may be a member of a third set of search results as it is most strongly associated with an entity associated with the president George Washington. In some implementations, the entity cluster module 112 may determine the sets of search results utilizing one or more techniques such as those described herein. For example, the entity cluster module 112 may determine a single entity for each search result and determine the sets of search results based on the determined single entity for each search result. Additional search results may be accessed in FIG. 5A by scrolling down in the user interface utilizing scroll element 505A, a user gesture on a presence-sensitive input mechanism (e.g., swiping via a touch-screen device), a mouse scroll, etc. For example, additional search results such as those illustrated in FIGS. 5B-5D may be accessed.

Figure 5B:
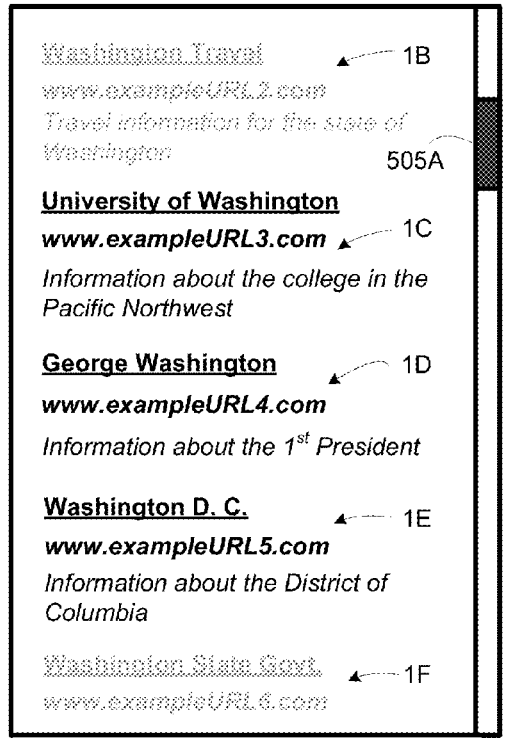
FIG. 5B is an example graphical user interface illustrating an example of a modified display of the search results of FIG. 5A based on a scrolling dismissal action associated with a first of the search results of FIG. 5A.

FIG. 5B is an example user interface illustrating an example of a modified display of the search results of FIG. 5A based on a scrolling dismissal action associated with the first search result 1A. FIG. 5B illustrates the same search results webpage as FIG. 5A, but the user has scrolled down in the interface, as indicated by the displacement of scroll element 505A, such that the first search result 1A is no longer visible and the second search result 1B is now the top-most displayed search result. Search results 1E and 1F are now also visible in FIG. 5B as a result of the scrolling down in the interface. The search result 1E may be a member of a fourth set of search results as it is most strongly associated with an entity associated with the District of Columbia. The search result 1F may be a member of the first set of search results as it is most strongly associated with the entity associated with the state of Washington.

The scrolling past the first search result 1A such that the first search result 1A is no longer visible may be determined to be a scrolling dismissal action associated with the first search result 1A. Scrolling past the first search result 1A may be indicative of lack of user interest in the first search result 1A. In some implementations the scrolling dismissal action may be recognized by a client device providing the interface of FIG. 5B for display to a user. For example, the client device may determine when the first search result 1A has been partially or wholly scrolled past in the user interface based on one or more embedded tags associated with the first search result 1A. Based on the scrolling dismissal action, modified search results that demote search results that are associated with the same first set of search results as the dismissed search result 1A are determined and provided in place of the search results. In the example graphical user interface of FIG. 5B, those search results that are members of the first set of search results have been demoted by increasing an amount of dimming associated with those search results and the search results that are not members of the first set of search results have been maintained. In particular, in the interface of FIG. 5B search results 1B and 1F that are members of the first set of search results are demoted by increasing an amount of dimming associated with those search results and search results 1C, 1D, and 1E that are not members of the first set of search results have been maintained. Generally, as used herein, increasing an amount of dimming includes changing the color of text, images, and/or other content of a search result to a lighter color (e.g., increasing the amount of white in black text) and/or increasing the amount of translucency in text, images, and/or other content of a search result.

Additional and/or alternative techniques for demoting a display of a search result by altering a display parameter of the search result may be utilized in addition to and/or as an alternative to increasing an amount of dimming of the search result. For example, text and/or other content of the search result may be stricken through, text and/or other content of the search result may be decreased in size, and/or the search result may be highlighted in a certain color indicating its demotion. Also, for example, the display parameters of the search results of the other sets of search results may be promoted to thereby demote the first set of search results. For example, the text and/or other content of the search results of the other sets may be increased in size and/or highlighted in a certain color indicating promotion.

Figure 5C:
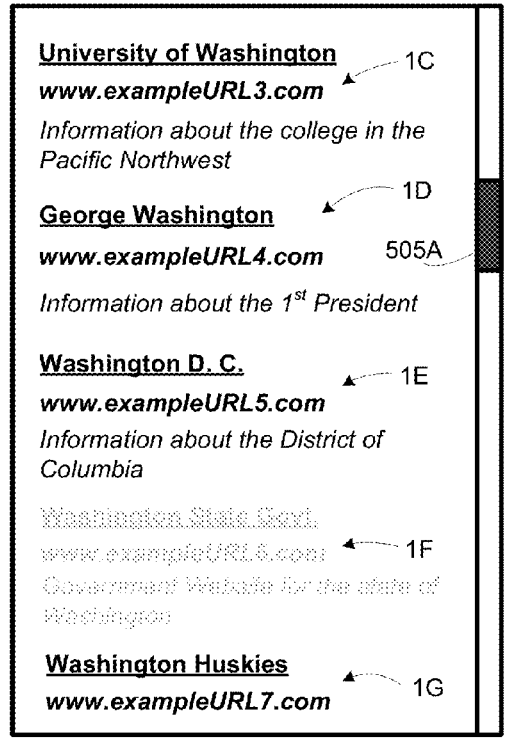
FIG. 5C is an example graphical user interface illustrating an example of a further modified display of the search results of FIG. 5A based on a scrolling dismissal action associated with a second of the search results of FIG. 5A.

FIG. 5C is an example user interface illustrating an example of a further modified display of the search results of FIG. 5A based on a scrolling dismissal action associated with the second search result 1B. FIG. 5C illustrates the same search results webpage as FIG. 5A and FIG. 5B, but the user has scrolled down further in the interface, as indicated by the displacement of scroll element 505A, such that the first search result 1A and the second search result 1B are no longer visible and the third search result 1C is now the top-most displayed search result. Search result 1G is now also visible in FIG. 5C as a result of the scrolling down in the interface. The search result 1G may be a member of the second set of search results as it is most strongly associated with an entity associated with the University of Washington.

The scrolling past the second search result 1B such that the second search result 1B is no longer visible may be determined to be a scrolling dismissal action associated with the second search result 1B. Scrolling past the second search result 1B may be indicative of lack of user interest in the second search result 1B and indicative of further lack of user interest in the first set of search results with which search results 1A and 1B are associated. In some implementations the scrolling dismissal action may be recognized by a client device providing the interface of FIG. 5B for display to a user. Based on the scrolling dismissal action, modified search results that further demote search results that are associated with the first set of search results as the dismissed search results 1A and 1B are determined and provided in place of the search results. In the example graphical user interface of FIG. 5C, those search results that are members of the first set of search results have been further demoted by further increasing an amount of dimming associated with those search results and the search results that are not members of the first set of search results have been maintained. In particular, in the interface of FIG. 5C search result 1F that is a member of the first set of search results is demoted by further increasing an amount of dimming associated with the search result relative to the amount of dimming illustrated in FIG. 5B. Search results 1C-1E and 1G that are not members of the first set of search results have been maintained.

Figure 5D:
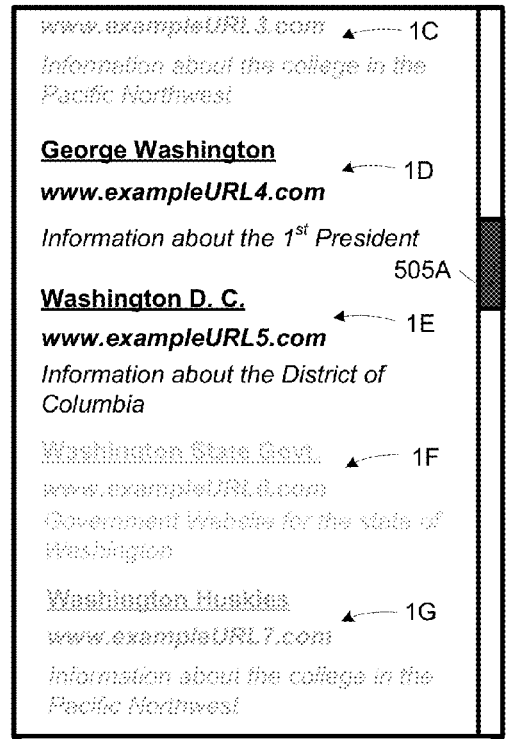
FIG. 5D is an example graphical user interface illustrating an example of a further modified display of the search results of FIG. 5A based on a scrolling dismissal action associated with a third of the search results of FIG. 5A.

FIG. 5D is an example user interface illustrating an example of a further modified display of the search results of FIG. 5A based on a scrolling dismissal action associated with the third search result 1C. FIG. 5D illustrates the same search results webpage as FIG. 5A, FIG. 5B, and FIG. 5C, but the user has scrolled down further in the interface, as indicated by the displacement of scroll element 505A, such that the first search result 1A and the second search result 1B are no longer visible and the third search result 1C is partially scrolled past. Search result 1G is now also fully visible in FIG. 5D as a result of the scrolling down in the interface.

The partial scrolling past the third search result 1C such that the third search result 1C is no longer fully visible may be determined to be a scrolling dismissal action associated with the third search result 1C. In some other implementations the third search result 1C may need to be fully scrolled past, or scrolled past to a greater extent than illustrated in FIG. 5D for a scrolling dismissal action associated with the third search result 1C to be determined. Scrolling past the third search result 1C may be indicative of lack of user interest in the third search result 1C and in the second set of search results with which search result 1C is associated. In some implementations the scrolling dismissal action may be recognized by a client device providing the interface of FIG. 5D for display to a user. Based on the scrolling dismissal action, modified search results that demote search results that are associated with the second set of search results are determined and provided in place of the search results. In the example graphical user interface of FIG. 5D, those search results that are members of the second set of search results have been demoted by increasing an amount of dimming associated with those search results. In particular, in the interface of FIG. 5D search results 1C and 1G that are members of the second set of search results are demoted by increasing an amount of dimming associated with the search results. It is noted that the dimming applied in FIG. 5C to the search result 1F associated with the first set of search results has been maintained. Moreover, it is noted that the amount of dimming associated with the search result 1F is greater than the amount of dimming associated with search results 1C and 1F due to the two dismissal actions associated with the first set of search results as compared to the single dismissal action associated with the second set of search results.

Further scrolling down in the search results webpage may lead to further modification of the search results. For example, in some implementations scrolling past search result 1F may lead to further dimming of search results associated with the first set of search results and/or may lead to complete hiding of search results associated with the first set of search results. In some implementations additional search results webpages may be selected via, for example, a listing of search results pages at the bottom of the search results webpage. An additional search results webpage may present a new search results webpage that includes additional search results responsive to the search query "washington". In some implementations the additional search results page may initially include dimmed search results based on dismissal actions associated with the search results on the search results webpage of FIGS. 5A-5D (e.g., the amount of dimming for a given set of search results will be maintained). In some of those implementations further modification of the search results may occur based on dismissal actions on the additional search results webpage. In some implementations the additional search results webpage may initially present all search results in an unmodified state and dismissal actions on the new search results webpage may be utilized to modify the search results of the new search results page.

As described herein, the instruction module 114 may provide instructions to enable modification of the search results webpage of FIG. 5A to create a modified display of search results as illustrated in one or more of the example graphical user interfaces of FIGS. 5B-5D. Based on the instructions and the sets of search results determined via the entity cluster module 112, the search system 102 and/or the client device 106 may determine the modified display of search results in response to a dismissal action associated with one or more of the search results. In some implementations the instructions to modify the search results may be provided for execution on the client device 106. For example, the search results webpage of FIG. 5A may be provided to the client device 106 by the search system 102 with search result set information that associates each search result with one or more of the sets of search results and that includes the instructions to modify the search results in response to a dismissal action associated with one or more of the search results. The browser 107 may provide the initial display of the search results in FIG. 5A that includes search results from all of the sets of search results. The browser 107 may execute the instructions to determine a dismissal action associated with one of the search results; determine the search result is associated with one or more sets of search results based on the search result set information; determine modified search results that demote search results that are members of the same one or more sets of search results; and provide the modified search results in place of the search results.

In some implementations the instructions to modify the search results based on a dismissal action associated with one of the search results may be provided to the search system 102 and executed, in whole or in part, by the search system 102. For example, an indication of a dismissal action may be received by the search system 102, and the ranking engine 110 may execute the instructions to modify the display of the search results and provide the modified display of search results to the client device. For example, the modified display of search results may be provided as a new search results webpage to the client device 106 and/or may be communicated to the client device 106 to enable the client device 106 to update a search results webpage.

Although a particular technique is described with respect to FIGS. 5A-5D, additional and/or alternative techniques may be utilized. For example, in some implementations multiple dismissal actions associated with a set of search results may be required before dimming of search results associated with that set. For example, in some implementations a dismissal value indicative of the number of dismissal actions may be determined and the search results modified only if the dismissal action satisfies a dismissal value threshold. For example, in some implementations two dismissal actions must be determined for a set of search results before dimming of search results associated with that set occurs. For example, in some implementations the search results 1B and 1F may be non-dimmed in FIG. 5B and search result 1F only initially dimmed in FIG. 5C. Also, in some implementations dismissal actions may be directed to search results that are associated with more than one search result set. For example, a dismissal action may be associated with a search result associated with a first search result set and a second search result set. The dismissal action may lead to demotion of search results associated with the first search result set and the second search result set. For example, in some implementations search results associated with the first search result set and the second search result set may be demoted equally. Also, for example, in some implementations search results associated with the first search result set and the second search result set may be demoted based on the strength of the association of each set with the search result with which the dismissal action is associated. For example, if the entity of the first search result set is more strongly associated with the search result than the entity of the second search result set, the first search result set may be demoted more significantly than the second search result set.

With reference to FIGS. 6A-6D, example graphical user interfaces are illustrated and utilized in describing example methods of modifying an initial display of search results based on a dismissal action associated with one of the search results. The example graphical user interfaces of FIGS. 6A-6D may be displayed to a user via one or more applications executing on client device 106 such as browser 107.

Figure 6A:
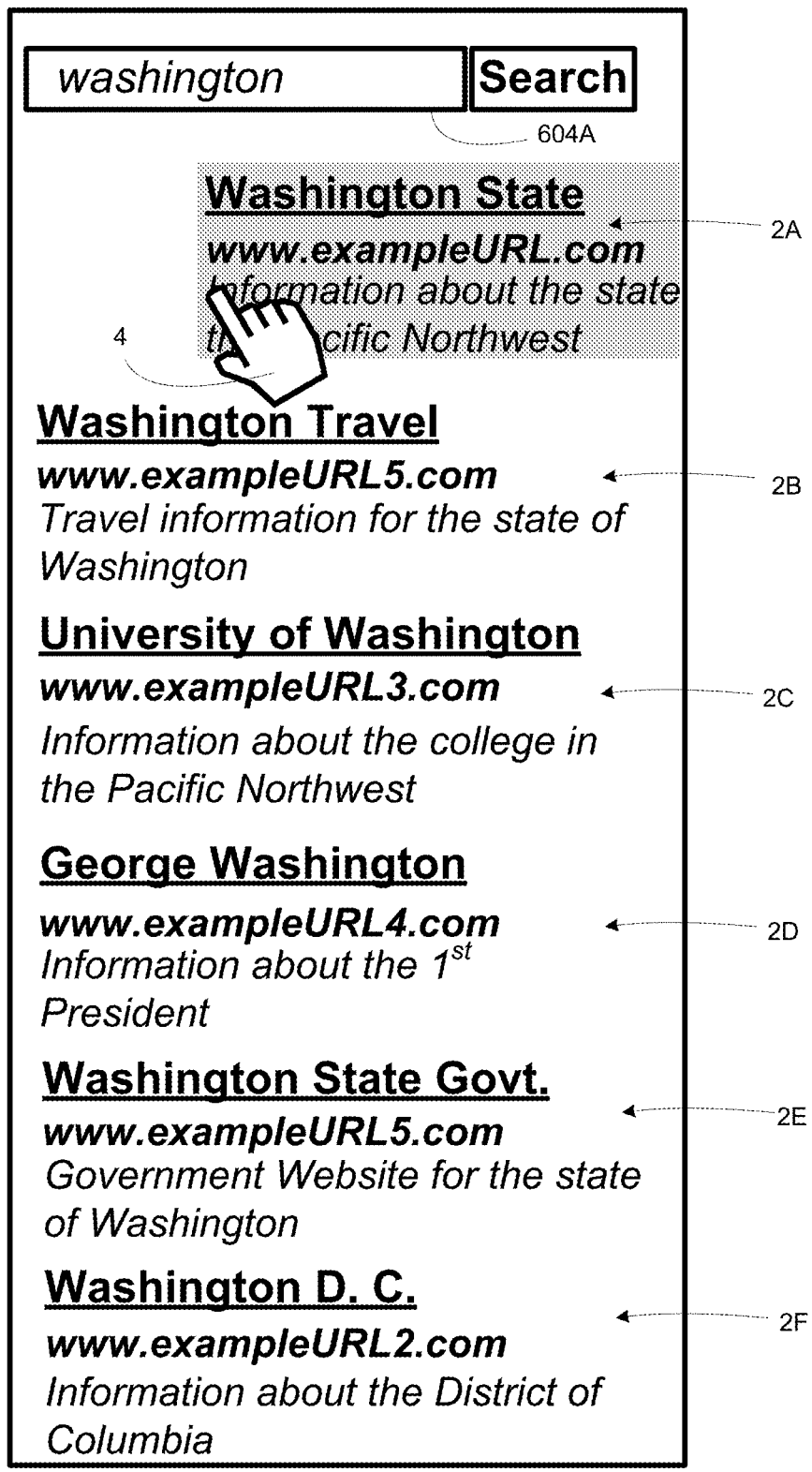
FIG. 6A is an example graphical user interface illustrating an example of an initial display of search results for a search query and a swiping away dismissal action associated with a first of the search results.

In FIG. 6A the search query "washington" 604A is submitted to a search system 102, via the graphical user interface, and a set of search results that are responsive to the search query 604A are generated by the search system 102 and provided for presentation in the user interface. The search results in FIG. 6A include search results 2A-F that are based on search result documents responsive to the query. The search results 2A-F may be ranked according to one or more signals as described herein such as document based signals and/or query based signals.

The search results 2A, 2B, and 2E may be members of a first set of search results as they are all most strongly associated with a shared entity associated with the state of Washington. The search result 2C may be a member of a second set of search results as it is most strongly associated with an entity associated with the University of Washington. The search result 2D may be a member of a third set of search results as it is most strongly associated with an entity associated with the president George Washington. The search result 2F may be a member of a fourth set of search results as it is most strongly associated with an entity associated with the District of Columbia. In some implementations, the entity cluster module 112 may determine the sets of search results utilizing one or more techniques such as those described herein. For example, the entity cluster module 112 may determine a single entity for each search result and determine the sets of search results based on the determined single entity for each search result. Additional search results may be accessed in FIG. 6A by scrolling down in the user interface utilizing a scroll element, a user gesture on a presence-sensitive input mechanism (e.g., swiping via a touch-screen device), a mouse scroll, etc.

In FIG. 6A a swiping away action associated with the first search result 2A is illustrated. The first search result 2A is illustrated partially swiped away. A graphical element 4 is illustrated atop the search result 2A and is indicative of a swiping away of the first search result 2A. For example, the graphical element 4 may be indicative of a mouse-click on the search result 2A followed by dragging away of the search result 2A, a swiping away gesture over the search result 2A by a user's finger on a presence-sensitive input mechanism, an eye-movement based swiping away directed toward the search result 2A, and/or any other appropriate swiping away mechanism.

Figure 6B:
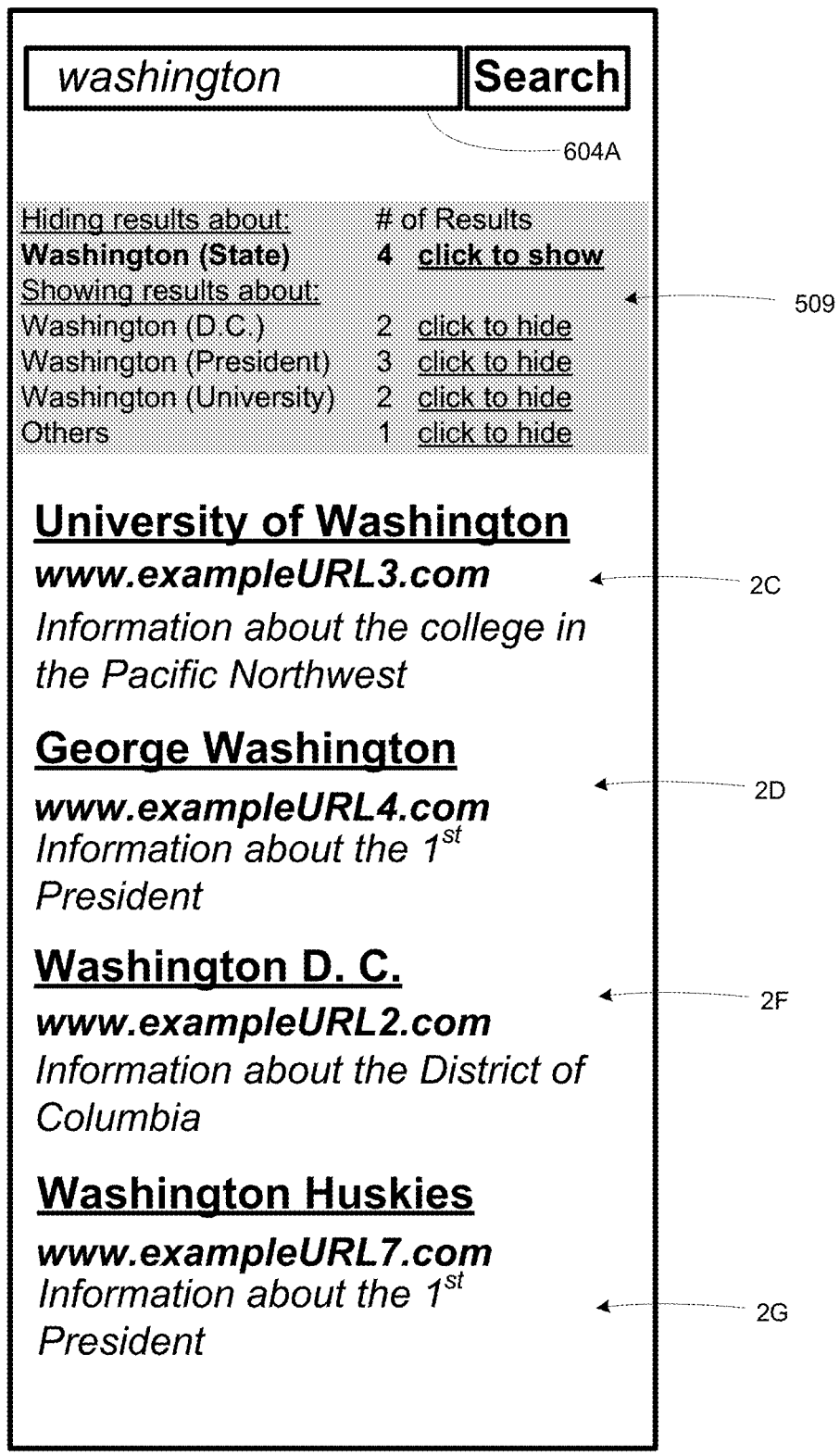
FIG. 6B is an example graphical user interface illustrating an example of a modified display of the search results of FIG. 6A based on the swiping away dismissal action of the first of the search results of FIG. 6A.
Figure 6C:
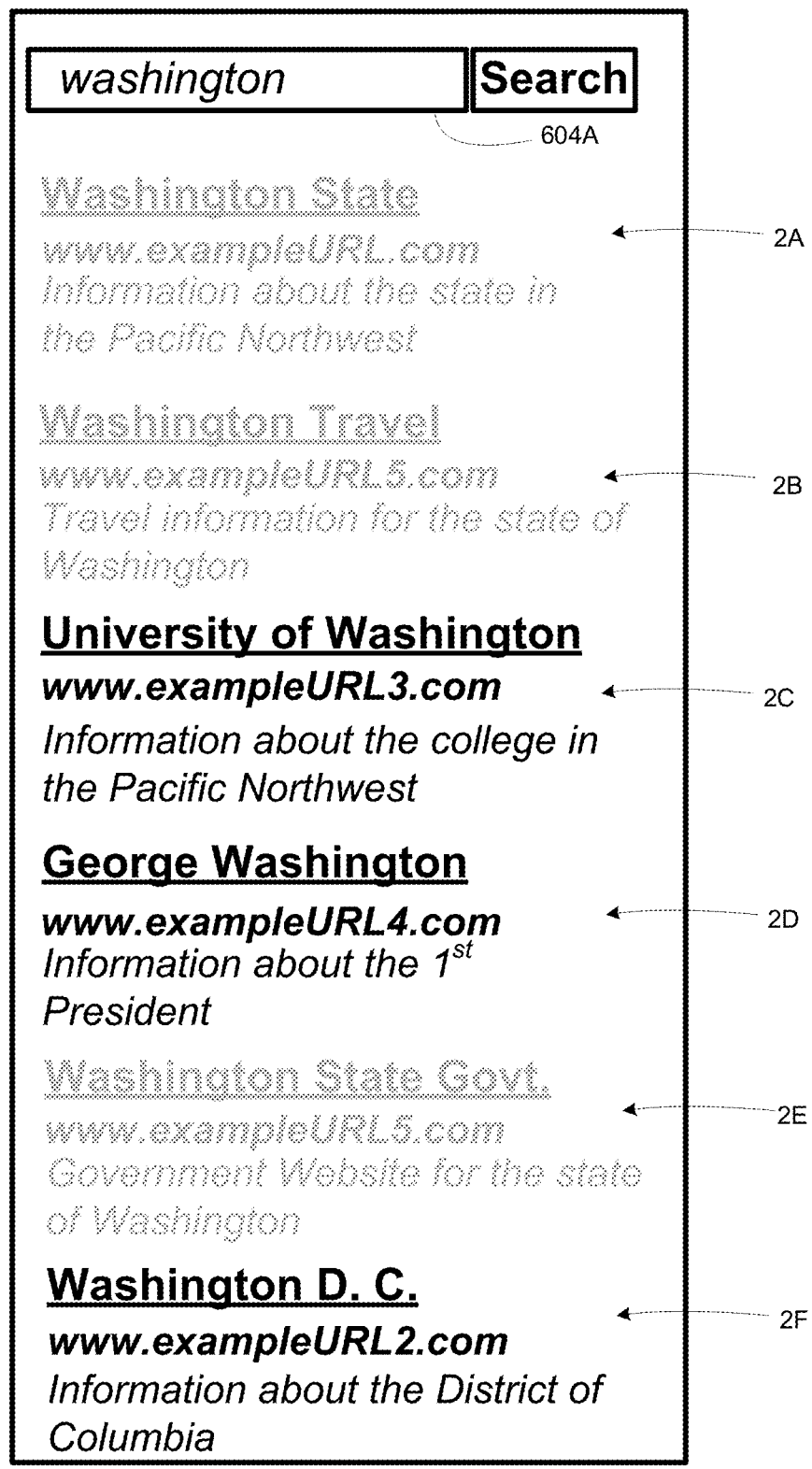
FIG. 6C is an example graphical user interface illustrating another example of a modified display of the search results of FIG. 6A based on the swiping away dismissal action of the first of the search results of FIG. 6A.
Figure 6D:
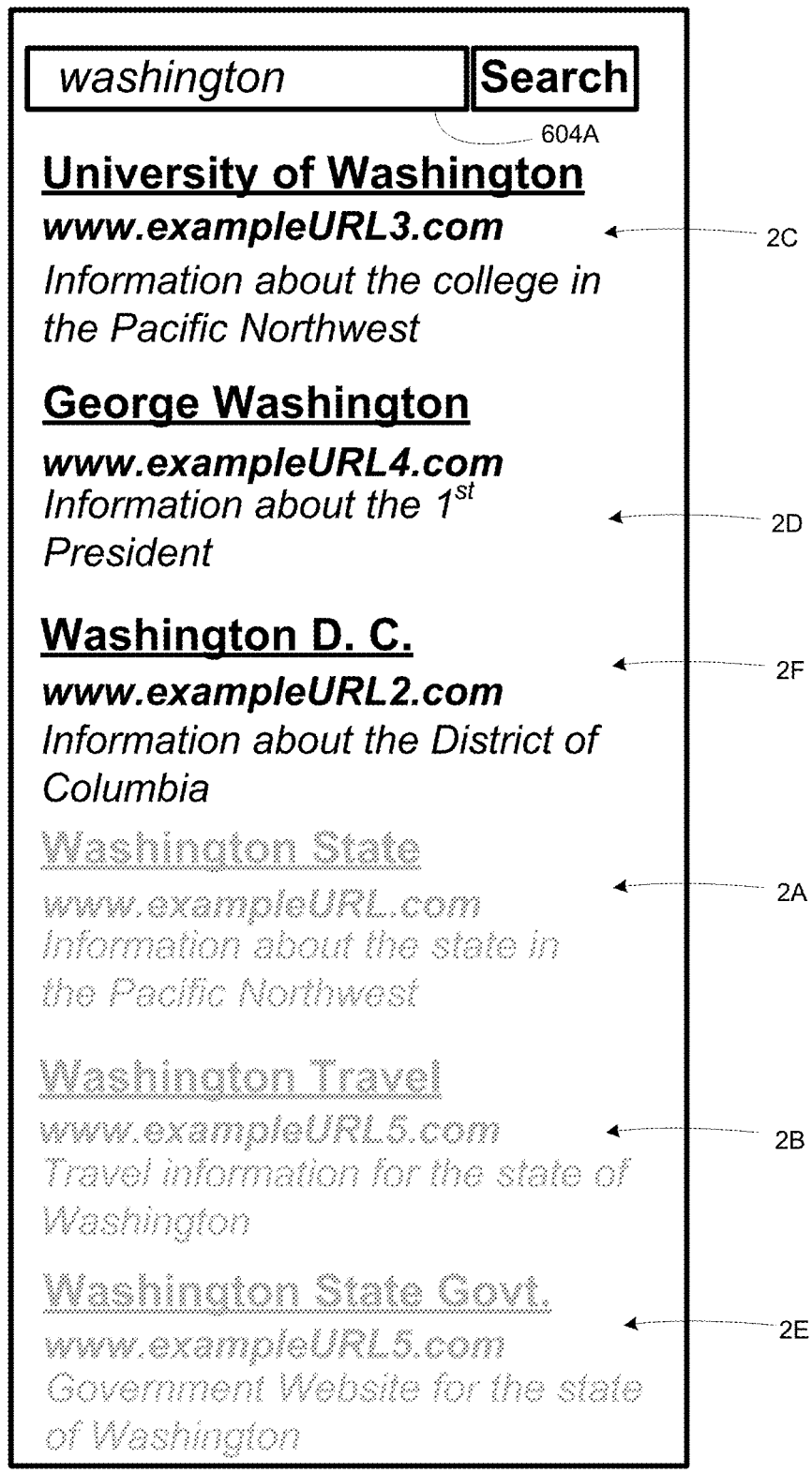
FIG. 6D is an example graphical user interface illustrating another example of a modified display of the search results of FIG. 6A based on the swiping away dismissal action of the first of the search results of FIG. 6A.

FIGS. 6B, 6C, and 6D are example graphical user interfaces illustrating three separate examples of a modified display of the search results of FIG. 6A based on the user dismissal action associated with the search result 2A of FIG. 6A. Additional and/or alternative graphical user interfaces may be utilized, including those that combine aspects from one or more of the examples of FIGS. 6B, 6C, and 6D. Also, in some implementations scrolling away dismissal actions, such as that described with respect to FIGS. 5A-5D, may be combined with the swiping away dismissal action described with respect to FIGS. 6A-6D. For example, a search results webpage may modify search results based on dismissal actions via scrolling and/or via swiping away. In some implementations, the modification of the search results may depend on the type of dismissal action. For example, in some implementations swiping away of a search result of a first search result set may lead to omission of other search results from the search result set, whereas scrolling past a search result of a search results set may lead to dimming of other search results from the search result sets. Also, for example, in some implementations swiping away of a search result of a first search result set may lead to dimming of other search results from the search result set to a first degree, whereas scrolling past a search result of a first search result set may lead to dimming of other search results from the search result sets to a second degree that is less extreme than the first degree.

FIG. 6B is an example graphical user interface illustrating an example of a modified display of the search results of FIG. 6A based on the swiping away dismissal action of the first of the search results of FIG. 6A. In the example graphical user interface of FIG. 6B, those search results that are members of the first set of search results that were provided on the search results webpage of FIG. 6A have been omitted and the search results associated with the other sets of search results have been maintained. In particular, search results 2A, 2B, and 2E that are members of the first set of search results have been omitted and search result 2C, 2D, and 2F have been maintained. Search result 2G is also maintained and is likewise not a member of the first set of search results as it is most strongly associated with the entity associated with the University of Washington. The search result 2G may be an additional search result that was provided on the search results webpage of FIG. 6A and may have been accessed in FIG. 6A by scrolling down in the user interface.

Also provided in FIG. 6B is a search result set summary 609 that illustrates that a filter is currently being applied to omit results from the first set of search results that are associated with the entity associated with the state of Washington and to show search results from the other sets of search results that are associated with distinct entities. The search result summary 609 also illustrates the number of search results of the search results webpage of FIG. 6A that are associated with each of the listed entities. It is noted that some of the search results of the search result summary 609 may be additional search results that were provided on the search results webpage of FIG. 6A and may have been accessed in FIG. 6A by scrolling down in the user interface. The search result summary 609 also provides the user the option to select "click to show" to show results about the first set of search results that are associated with the entity associated with the state of Washington and with options to "click to hide" to hide a respective set of search results that are associated with a distinct entity. For example, selecting "click to hide" in the row listing Washington (D.C.) may omit search results associated with the entity associated with the District of Columbia.

FIG. 6C is an example graphical user interface illustrating another example of a modified display of the search results of FIG. 6A based on the swiping away dismissal action of the first of the search results of FIG. 6A. In the example graphical user interface of FIG. 6C, the amount of dimming has been increased for those search results that are members of the first set of search results that were provided on the search results webpage of FIG. 6A. In particular, in the interface of FIG. 6C the amount of dimming is increased for search results 2A, 2B, and 2E that are members of the first set of search results. In some implementations the display of FIG. 6C may be provided with a search result set summary showing information related to the demoted first set, such as one similar to search result summary 609 of FIG. 6B.

FIG. 6D is an example graphical user interface illustrating another example of a modified display of the search results of FIG. 6A based on the swiping away dismissal action of the first of the search results of FIG. 6A. In the example graphical user interface of FIG. 6C, the amount of dimming has been increased for those search results that are members of the first set of search results that were provided on the search results webpage of FIG. 6A. In particular, in the interface of FIG. 6C the amount of dimming is increased for search results 2A, 2B, and 2E that are members of the first set of search results. Also, in the example graphical user interface of FIG. 6D, the display positions of the search results of the first set of search results have been demoted and the display positions of the search results of the other sets of search results have been promoted. Although FIG. 6D illustrates both dimming and demoting of the display position of the search results that are members of the first set, in some implementations only demoting of the display position may be utilized. In some implementations the display of FIG. 6D may be provided with a search result set summary showing information related to the demoted first set, such as one similar to search result summary 609 of FIG. 6B.

Many other configurations are possible having more or fewer components than the environment shown in FIG. 1. For example, in some environments the entity cluster module 112 and/or the instruction module 114 may be combined.

Figure 2:
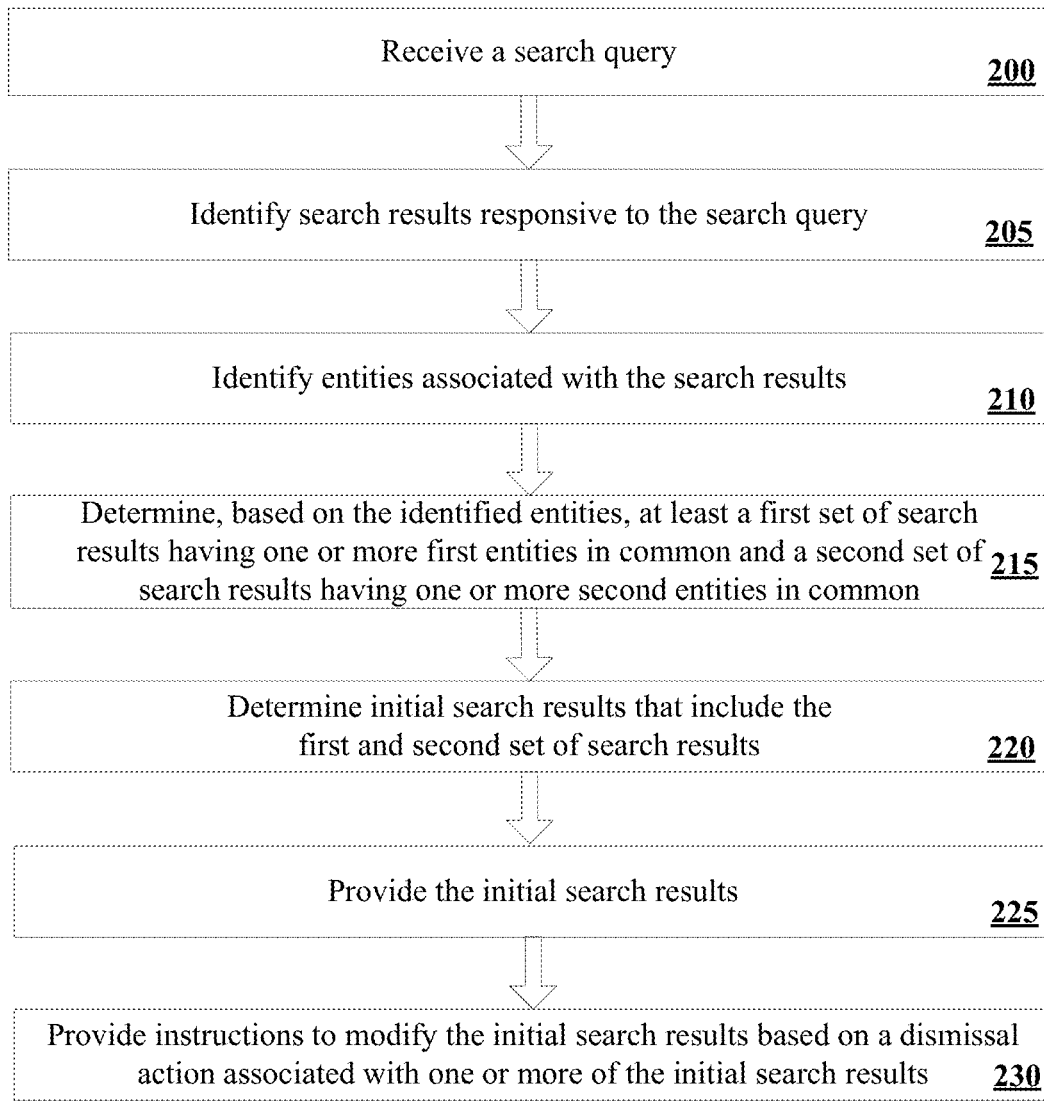
FIG. 2 is a flow chart illustrating an example method of providing search results and providing instructions to modify the search results.

FIG. 2 is a flow chart illustrating an example method of providing initial search results and providing access to instructions to modify the initial search results. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the search system 102 of FIG. 1.

At step 200, a search query is received. In some implementations the search system 102 may receive the search query from a computing device such as client device 106.

At step 205, search results are identified based on the search query received at step 200. For example, in some implementations the ranking engine 110 may use the index 125 to identify documents responsive to the search query and determine search results associated with such documents.

At step 210, entities are identified that are associated with the search results identified at step 205. In some implementations, the entity cluster module 112 may determine an entity that is associated with a search result by referencing index 125 and/or other database that contains information related to one or more entities associated with a search result and/or a document associated with a search result. For example, index 125 may contain, for each of a plurality of documents, a mapping between the document and one or more entities related with the document. Thus, in some implementations the index 125 may be referenced to identify one or more entities associated with the search result document that is associated with a search result.

At step 215, at least a first set of search results and a second set of search results are determined. The first set of search results includes one or more search results each associated with one or more first entities of the entities identified at step 210. The second set of search results includes one or more search results each associated with one or more second entities of the entities identified at step 210. One or more of the first entities are distinct from one or more of the second entities. In some implementations more than two sets of search results may be determined. In some implementations, the entity cluster module 112 determines sets of search results responsive to a search query based on entities associated with the search results. For example, the entity cluster module 112 may determine a first set of search results that are all associated with a shared entity A and a second set of search results that are all associated with a shared entity B. The search results responsive to a query for which sets of search results are determined may be all search results responsive to the query or may be a subset of search results.

At step 220, initial search results that include the first and second set of search results are determined. For example, the initial search results may include the top X ranked search results of those identified at step 205. As described herein, in some implementations the ranking engine 110 may determine a ranking of the search results. The initial search results may include one or more search results from the first set of search results and one or more search results from the second set of search results.

At step 225, the initial search results are provided. For example, the search system 102 may transmit the initial search results to the client device 106 in a form that may be provided to the user. For example, the search results 108 may be transmitted as a search results web page to be displayed via the browser 107 executing on the client device and/or as one or more search results conveyed to a user via audio. FIG. 5A presents one example of a search results webpage and is described in additional detail herein.

At step 230, instructions to modify the initial search results are provided. The instructions are instructions to modify the initial search results based on a dismissal action associated with one or more of the initial search results. Generally, the instructions to modify the initial search results include instructions to: determine a dismissal action associated with one or more of the search results provided at step 225 belonging to one or more sets of the search results, wherein the dismissal action is indicative of lack of user interest in the one or more search results; and/or determine, based on the dismissal action associated with the one or more search results, modified search results that omit or demote search results that are associated with the same one or more sets of search results as the dismissed search results. For example, with reference to FIG. 4A, a user dismissal action associated with a search result S1 from a search results webpage listing search results S1-S10 may be determined; modified search results may be determined that demote or omit search results S1, S2, and S9 that are associated with the same set of search results as search result S1 (set 1) and that maintain search results S3-S8 and S10 that are associated with other search result sets (e.g., sets 2-5); and the modified search results may be provided to the user in place of the search results 108. For example, the modified search results may be displayed to the user in response to the dismissal action associated with search result S1. Also, for example, with reference to FIG. 4B, a user dismissal action associated with a search result S12 from a search results webpage listing search results S11-S20 may be determined; modified search results may be determined that demote or omit search results S11-S15, and S18 that are associated with one or more of the same sets of search results as search result S12 (sets 1 and 2) and that maintain search results S16, S17, S19, and S20 that are associated with other search result sets (e.g., sets 3 and 4); and the modified search results may be provided to the user in place of the search results 108. Also, for example, with continued reference to FIG. 4B, a user dismissal action associated with a search result S11 from a search results webpage listing search results S11-S20 may be determined; and modified search results may be determined that demote search results S11 and S15 that are associated with the same sets of search results as search result S11 (set 1). In some implementations search results S12 and S18 may also be demoted as they are likewise associated with the same set of search results as search result S11 (set 1) and an additional set of search results (set 2). In some implementations the demotion of search results S12 and S18 may be to a lesser degree than the demotion of search results S11 and S15 since search results S12 and S18 are additional associated with entity B, whereas the dismissal action was associated with search result S11, which is only associated with entity A. The modified search results may be provided to the user in place of the search results 108.

In some implementations the instructions may be provided to a client device to which the initial search results are provided at step 225. For example, the instructions may be included with and/or mapped in a provided search results webpage as a client-side script and the client device 106 may access the script and execute the instructions to modify the search results. In some implementations, when instructions are provided to the client device 106, search result set information may be provided to the client device 106 to determine which search results to maintain, omit, and/or demote in response to a dismissal action associated with one or more of the search results. Such search result information may be provided with the initial search results at step 225 and/or may be embedded in the instructions to which access is provided at step 230. In some implementations access to the instructions may be provided to the search system 102 and the search system 102 may execute, in whole or in part, the instructions to modify the search results. For example, an indication of a user dismissal of a search result via client device 106 may be received by the search system 102, and the ranking engine 110 may execute the instructions to modify the display of the search results and provide the modified display of search results to the client device 106. For example, the modified search results may be provided as a new search results webpage to the client device 106 and/or may be communicated to the client device 106 via a script executing on the client device 106 to enable the client device 106 to update a search results webpage. In some implementation, executing the instructions, by a client device and/or the search system, may include steps 305 and/or 310 of FIG. 3.

Figure 3:
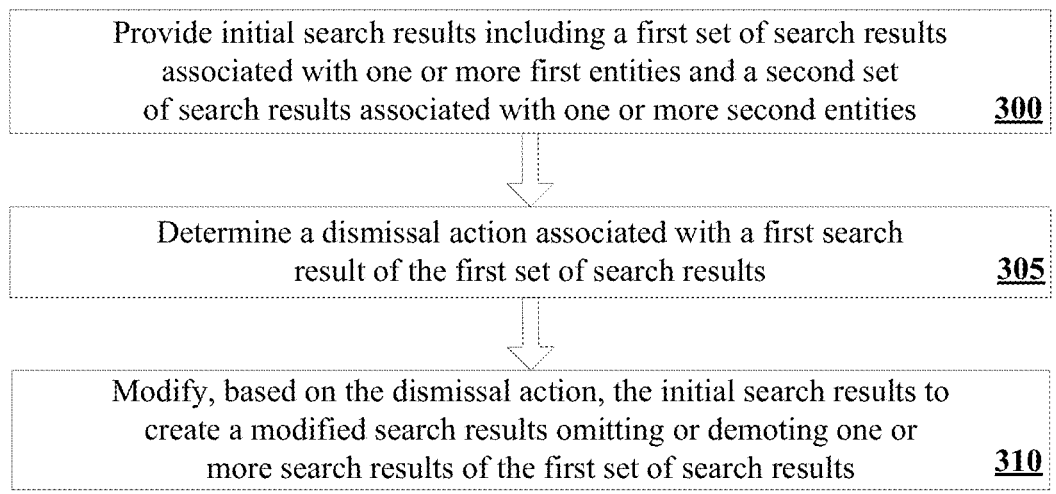
FIG. 3 is a flow chart illustrating an example method of modifying search results based on a dismissal action associated with one or more of the search results.

FIG. 3 is a flow chart illustrating an example method of modifying search results based on a dismissal action associated with one or more of the search results. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the search system 102 of FIG. 1 and/or the client device 106 of FIG. 1.

At step 300, initial search results are provided that include a first set of search results associated with one or more first entities and a second set of search results associated with one or more second entities. In some implementations more than two sets of search results may be included. In some implementations step 300 may be performed by the search system 102. For example, the search system 102 may provide the initial search results to the client device 106 in a form that may be provided to the user. For example, the search results 108 may be transmitted as a search results web page to be displayed via the browser 107 executing on the client device 106 and/or as one or more search results conveyed to a user via audio. In implementations in which step 300 is performed by the search system 102, step 300 may share one or more aspects in common with step 225 of FIG. 2. In some implementations step 300 may additionally and/or alternatively be performed by the client device 106. For example, the client device 106 may provide an initial presentation of the search results to a user by providing output to enable presentation of the search results to the user, such as visual and/or audible presentation of the search results. For example, the browser 107 may provide an initial display of search results by providing output enabling the search results to be viewed on a screen by a user.

At step 305, a dismissal action associated with a first search result of the first set of search results is determined. In some implementations step 305 may be performed by the search system 102. For example, the search system 102 may receive an indication of a user dismissal action associated with a search result. In some implementations the indication of a user dismissal action associated with may be received via an input from client device 106. For example, the client device 106 may determine a dismissal action associated with a search result and transmit an indication of the dismissal action to the search system 102. In some implementations step 305 may additionally and/or alternatively be performed by the client device 106. For example, the client device 106 may determine a dismissal action associated with a search result based on a user interaction with the search result via an application executing on the client device 106 such as browser 107. For example, the browser 107 may be executing the instructions of step 230 to monitor for a dismissal action associated with a search result on a search results webpage. In some implementations the first search result may be a search result that links to a document that is hosted on a website that is distinct from the website providing the search results. In some implementations the first search result may be a search result that links to a document that is not a search results webpage providing search results for a unique query.

At step 310, the initial search results are modified based on the dismissal action to create a modified display of search results that omit or demote one or more search results of the first set of search results. In some implementations step 310 may be performed by the search system 102. For example, an indication of a dismissal action associated with a search result via the client device 106 may be provided to the search system 102, and the search system may modify the display of the search results and provide the modified display of search results to the client device 106. For example, the modified display of search results may be provided as a new search results webpage to the client device 106 and/or may be communicated to the client device 106 via an ECMAS script executing on the client device 106 to enable the client device 106 to update the search results webpage. In some implementations step 310 may be performed by the search system 102 without issuing of a new search query. In some other implementations the search system 102 may issue a new search query that is less focused on the entity associated with the first set of search results and provide search results from the new search query as a new search results webpage to the client device 106.

In some implementations step 310 may additionally and/or alternatively be performed by the client device 106. For example, the client device 106 may identify the one or more sets of search results associated with the dismissed search result, and modify the search results to demote or omit any search results that are associated with the one or more sets of search results associated with the dismissed search result. For example, the search results may be modified by decreasing the prominence or hiding the content of any search results that are associated with the one or more sets of search results associated with the dismissed search result via manipulation of the search results webpage in the browser 107. In some implementations the client device 106 may perform step 310 based on instructions provided as script instructions that are provided and/or mapped with initial search results provided via the search system 102. For example, the instructions may be provided as JavaScript instructions that are mapped in a search results webpage and the browser 107 may execute the JavaScript instructions.

The user may be provided with the modified presentation of search results. For example, the client device 106 may provide the modified presentation of search results to a user by providing output to enable presentation of the modified presentations of search results to the user, such as visual and/or audible presentation of the search results. For example, the browser 107 may provide the modified display of search results to the user in lieu of the initial display of search results provided at step 300.

Figure 7:
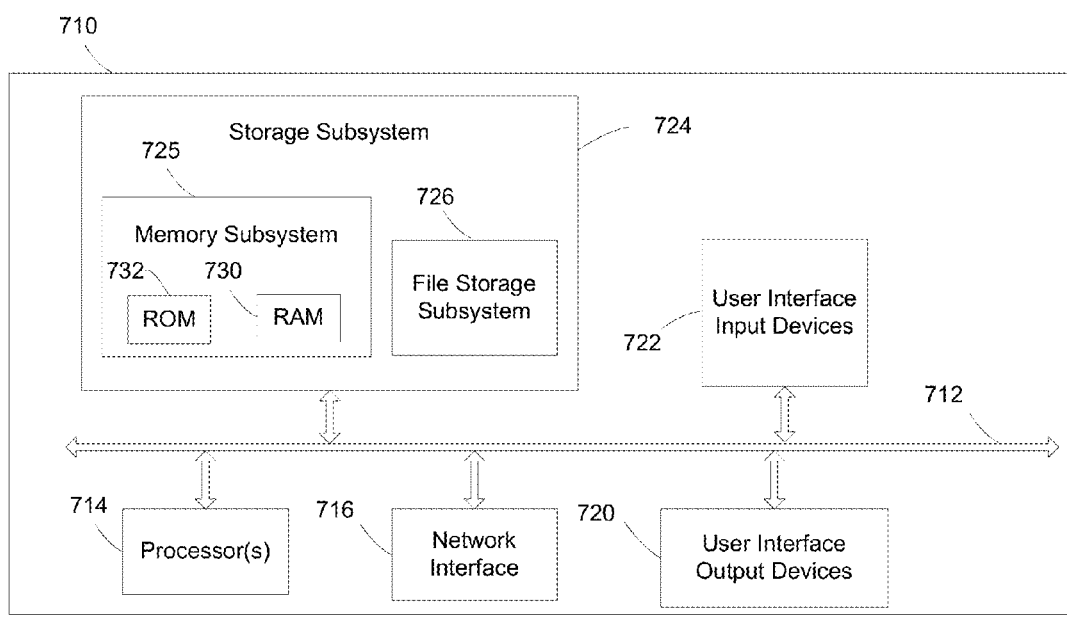
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to provide initial search results, provide instructions to modify the initial search results based on a dismissal action associated with one of the initial search results, and/or modify initial search results based on a dismissal action associated with one of the search results.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 724 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 724 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
providing initial search results that are responsive to a search query, the initial search results including a first set of search results that are each associated with a first entity and a second set of search results that are each associated with a second entity;
wherein the first entity is distinct from the second entity; and
wherein the first set of search results include one or more search results that are distinct from one or more of the search results of the second set of search results;
determining a dismissal action associated with a first search result of the first set of search results, the dismissal action indicative of lack of user interest in the first search result; and
modifying, based on the dismissal action, the initial search results to create modified search results, wherein modifying the initial search results includes omitting or demoting the first search result and omitting or demoting one or more additional search results of the first set of search results based on the first search result being of the first set of search results associated with the first entity and the one or more additional search results also being of the first set of search results associated with the first entity.

2. The method of claim 1, further comprising:
providing the modified search results in response to the dismissal action associated with the first search result.

3. The method of claim 1, wherein modifying the initial search results includes demoting the search results of the first set of search results, and wherein demoting the search results of the first set of search results includes:
altering, in the modified search results, at least one display parameter of the search results of the first set of search results.

4. The method of claim 3, wherein altering the display parameter includes increasing an amount of dimming.

5. The method of claim 4, further comprising:
determining a second dismissal action associated with a second search result of the first set of search results, the dismissal action indicative of lack of user interest in the second search result; and
further increasing, based on the dismissal action, the amount of dimming of the search results of the first set of search results.

6. The method of claim 1, further comprising:
determining a dismissal value of the first set of search results, the dismissal value indicative of a number of dismissed search results of the first set of search results, including the dismissal of the first search result by the dismissal action;
determining if the dismissal value satisfies a dismissal threshold; and
modifying the initial search results based on the dismissal action to create modified search results when the dismissal value satisfies the dismissal threshold.

7. The method of claim 1, wherein omitting or demoting the search results of the first set of search results includes:
omitting, in the modified search results, the search results of the first set of search results.

8. The method of claim 1, wherein the initial search results are provided as a search results webpage and wherein the dismissal action of the first search result includes scrolling past the first search result such that at least a portion of the first search result is no longer provided on a display of the search results webpage.

9. The method of claim 1, wherein the initial search results are provided as a search results webpage and wherein the dismissal action of the first search result includes swiping away of the first search result.

10. The method of claim 1, wherein the initial search results are provided as audible search results and wherein the dismissal action of the first search result includes a verbal user input dismissing the first search result.

11. The method of claim 1, wherein the initial search results are provided as a search results webpage and wherein modifying the initial search results includes:
generating a modified search results webpage to supplant the search results webpage.

12. The method of claim 1, wherein the initial search results are provided as a search results webpage and wherein modifying the initial search results includes:
modifying one or more presentation parameters of the search results webpage to provide the modified search results.

13. The method of claim 1, wherein omitting or demoting the search results of the first set of search results includes:
omitting or demoting, in the modified search results, the search results of the first set of search results, including any that are also of the second set of search results.

14. The method of claim 1, wherein omitting or demoting the search results of the first set of search results includes:
demoting, to a first degree, in the modified search results, the search results of the first set of search results that are not of the second set of search results; and
demoting, to a second degree, any of the search results of the first set of search results that are also members of the second set of search results;
wherein the first degree is greater than the second degree.

15. The method of claim 1, further comprising:
receiving the search query;
identifying the initial search results that are responsive to the search query;
identifying, for each search result of the initial search results, one or more entities associated with the search result;
determining one or more of the initial search results to include in the first set of search results based on association with the first entity of the entities; and
determining one or more of the initial search results to include in the second set of search results based on association with the second entity of the entities;
wherein providing the initial search results includes providing the initial search results to a client device.

16. The method of claim 1, wherein the search results of the first set of search results are all distinct from the search results of the second set of search results.

17. The method of claim 1, wherein providing the initial search results that are responsive to the query includes:
providing the initial search results to a client device to present the initial search results to a user.

18. The method of claim 1, wherein providing the initial search results that are responsive to the query includes:
presenting the initial search results to a user.

19. A system including memory and one or more processors operable to execute instructions stored in the memory, comprising instructions to:
provide initial search results that are responsive to a search query, the initial search results including a first set of search results that are each associated with a first entity and a second set of search results that are each associated with a second entity;
wherein the first entity is distinct from the second entity; and
wherein the first set of search results include one or more search results that are distinct from one or more of the search results of the second set of search results;
determine a dismissal action associated with a first search result of the first set of search results, the dismissal action indicative of lack of user interest in the first search result; and
modify, based on the dismissal action, the initial search results to create modified search results, wherein modifying the initial search results includes omitting or demoting the first search result and omitting or demoting one or more additional search results of the first set of search results based on the first search result being of the first set of search results associated with the first entity and the one or more additional search results also being of the first set of search results associated with the first entity.

20. A non-transitory computer readable storage medium storing computer instructions executable by a processor to perform a method comprising:
providing initial search results that are responsive to a search query, the initial search results including a first set of search results that are each associated with a first entity and a second set of search results that are each associated with a second entity;
wherein the first entity is distinct from the second entity; and
wherein the first set of search results include one or more search results that are distinct from one or more of the search results of the second set of search results;
determining a dismissal action associated with a first search result of the first set of search results, the dismissal action indicative of lack of user interest in the first search result; and
modifying, based on the dismissal action, the initial search results to create modified search results, wherein modifying the initial search results includes omitting or demoting the first search result and omitting or demoting one or more additional search results of the first set of search results based on the first search result being of the first set of search results associated with the first entity and the one or more additional search results also being of the first set of search results associated with the first entity one or more search results of the first set of search results.

* * * * *